Figures 1, 2:
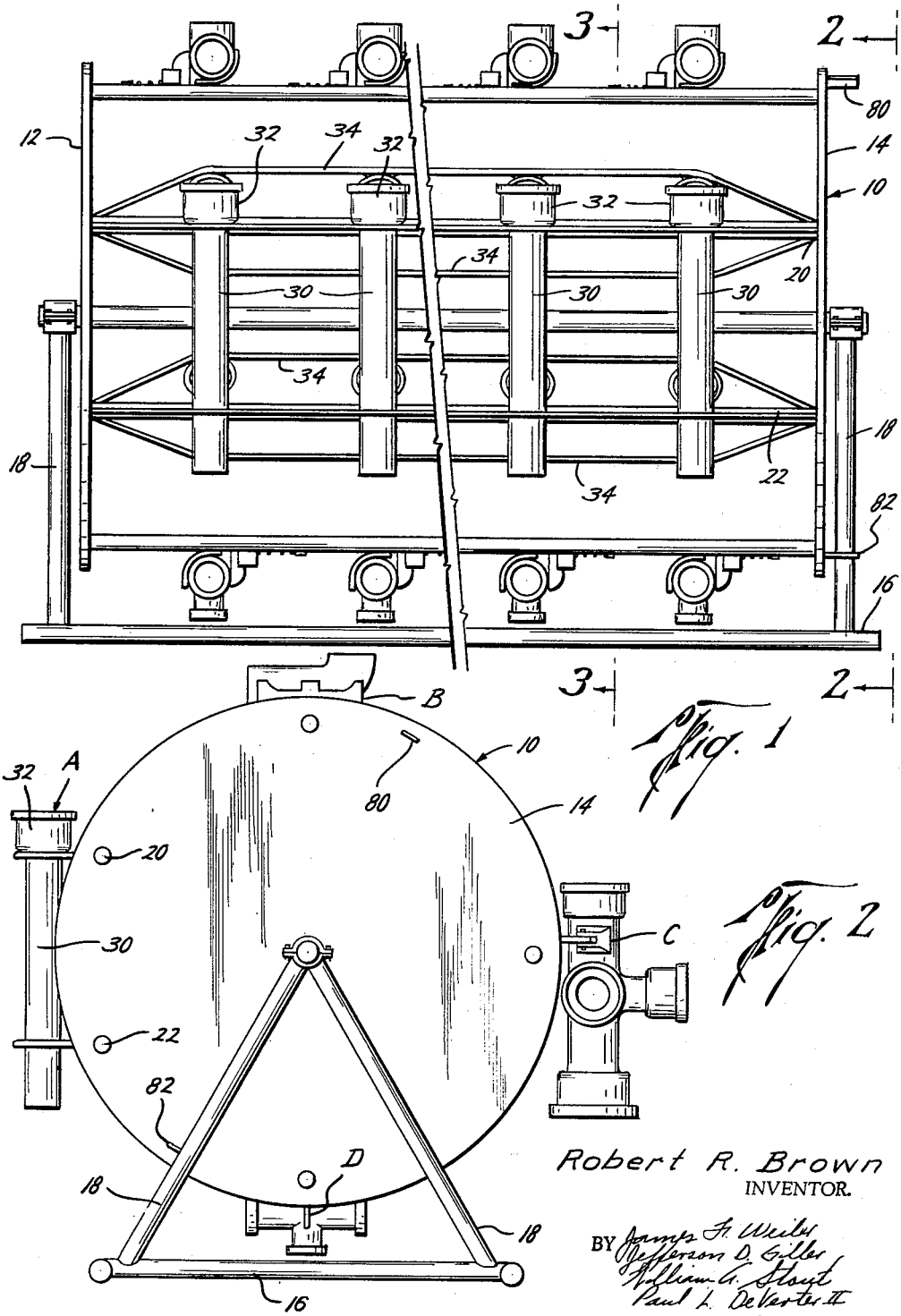

Dec. 22, 1964    R. R. BROWN    3,162,160
PLUMBING PIPE FABRICATION APPARATUS
Filed March 18, 1963    3 Sheets-Sheet 1

Robert R. Brown
INVENTOR.

BY
ATTORNEYS

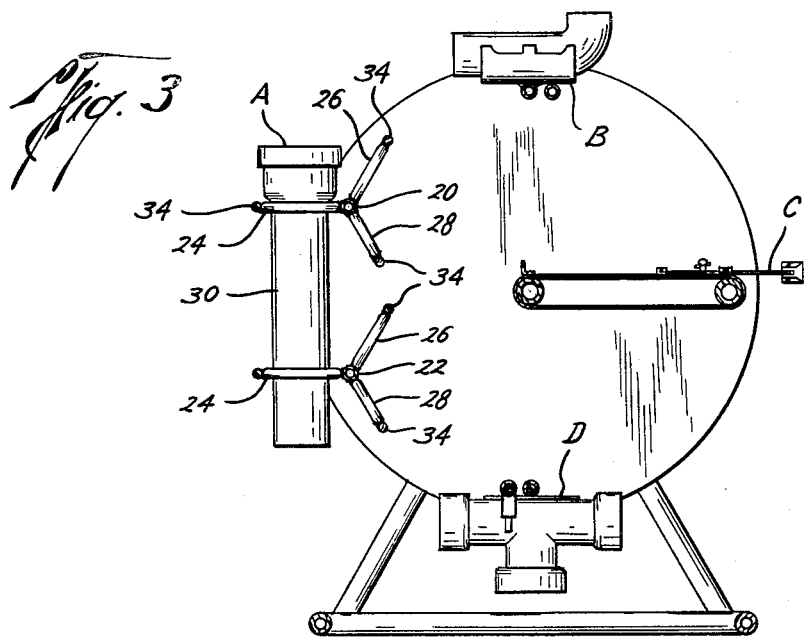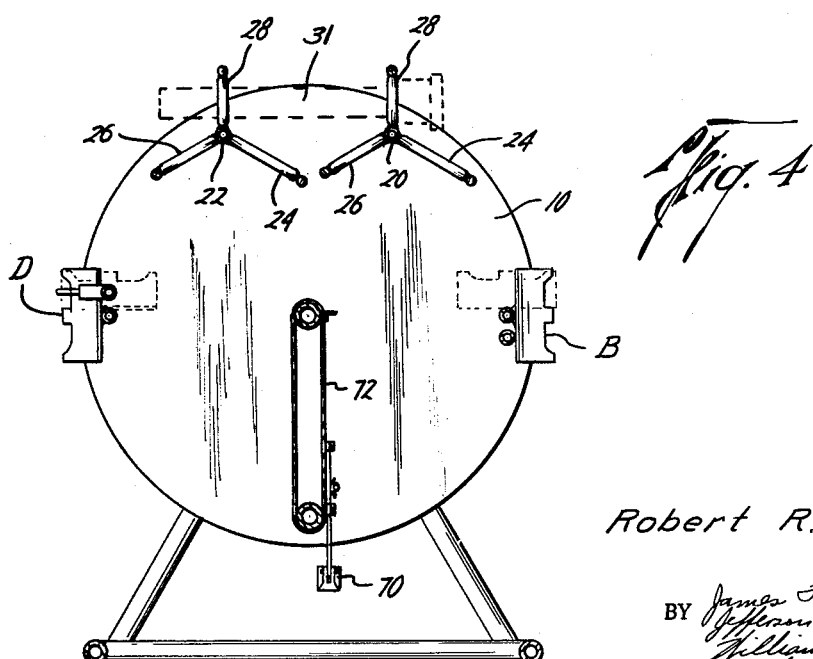

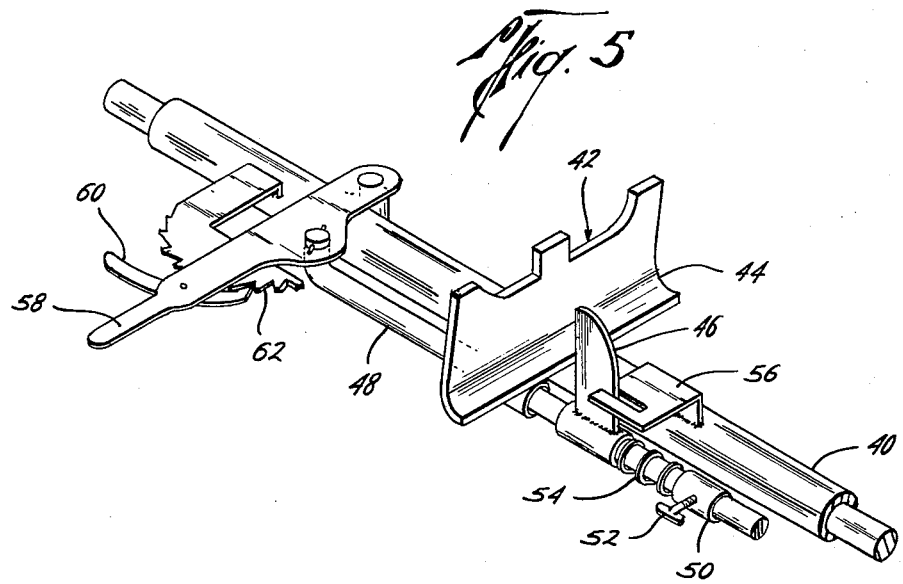
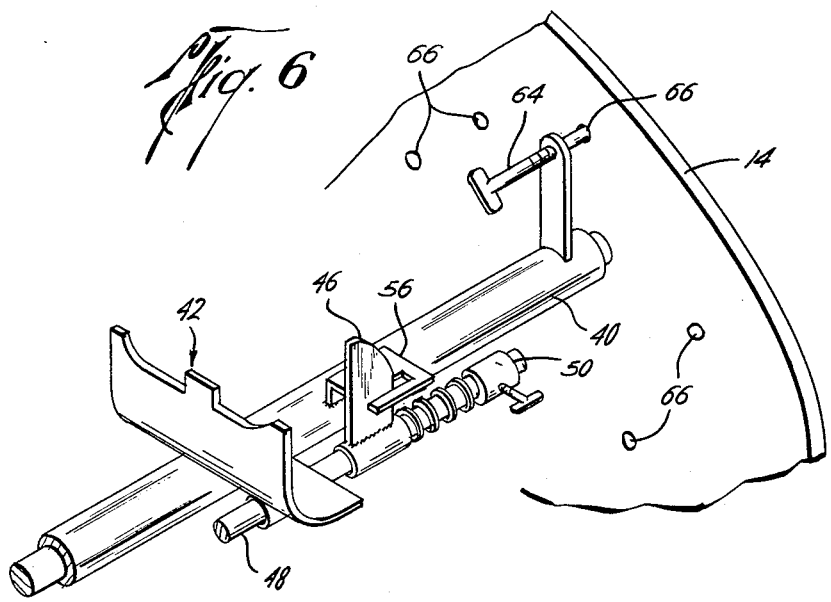

United States Patent Office 3,162,160
Patented Dec. 22, 1964

3,162,160
PLUMBING PIPE FABRICATION APPARATUS
Robert R. Brown, Houston, Tex., assignor to
Ralph P. Gilbert, Houston, Tex.
Filed Mar. 18, 1963, Ser. No. 265,631
9 Claims. (Cl. 113—102)

The present invention relates to a plumbing pipe fabrication apparatus, and more particularly, relates to a fabrication apparatus for making pipe joints with various size and shaped sections of pipe and pipe fittings.

Generally, it is the present practice of plumbers to assemble various lengths of soil pipe and soil pipe fittings on the job. Since this generally involves the joining together of the two desired pipes or fittings with a caulking substance such as oakum, pouring hot lead thereon, and packing the joint, such a procedure is time consuming as it requires the plumber to set up and to make a single joint at a time. While of course the sizes, fittings and layouts of various plumbing projects vary, in many instances such as large buildings, apartments, and subdivision homes, the same arrangement and combination of sizes and shapes are utilized over and over again. While it would not be feasible to prefabricate the entire plumbing layout, it would be desirable to prefabricate as many of the identical joints as possible, especially where this could be done on a production basis and thus could result in a tremendous saving in time and expense by prefabricating as many of these identical joint units as possible.

It is therefore a general object of the present invention to provide a plumbing pipe fabrication apparatus which is adapted to accommodate various sized and shaped pipes and fittings.

It is still a further object of the present invention to provide a plumbing pipe fabrication apparatus for simultaneously holding a plurality of pipe sections and fittings of various sizes and shapes which would allow the use of a production technique in making the pipe joints.

A still further object of the present invention is the provision of a plumbing pipe fabrication apparatus which is rotatable and includes a plurality of stations, each of which is adapted to accommodate a plurality of lengths of pipe or fittings in a manner suitable for making a joint and which stations can be moved to loading, unloading, or working positions.

A still further object of the present invention is the provision of a plumbing pipe fabrication apparatus including a plurality of pipe fitting holding units which are adjustable to hold various sizes of pipes and various sizes of pipe fittings, which units are movable into and out of working position and in addition may be rotated so that the various ends of the pipe fittings and pipe sections to be made into a joint may be positioned in an upright joint constructing position.

A still further object of the present invention is the provision of fitting clamps which include first and second clamp jaws which are yieldably urged towards each other for holding individual pipe fittings, which may be easily adjustable to hold various size pipe fittings, and in addition include a locking means for securely locking a plurality of the fitting clamps in holding position simultaneously.

Yet a still further object of the present invention is the provision of a plumber's pipe fabrication apparatus wherein two pipe supporting rods are positioned parallel to each other and include a plurality of co-acting rings of various sizes whereby the supporting rods may be suitably rotated for supporting various size pipes and which do not require time consuming pipe clamping structures.

Other and further objects, features and advantages will be apparent from the following description of a presently preferred embodiment of the invention, given for the purpose of disclosure, and taken in conjunction with the accompanying drawings, where like character references designate like parts throughout the several views, and where FIGURE 1 is an elevational view, partly in section, illustrating the apparatus of the present invention, FIGURE 2 is a cross-sectional view, taken along the line 2—2 of FIGURE 1, FIGURE 3 is a cross-sectional view taken along the line 3—3 of FIGURE 1, FIGURE 4 is a cross sectional view somewhat similar to FIGURE 3, but showing the present device rotated to a different position and also showing in dotted lines how the individual fitting clamps and pipe ring supports may be rotated, FIGURE 5 is a fragmentary perspective view showing one end of one of the fitting holding stations and showing the details of construction of a fitting clamp, and FIGURE 6 is a fragmentary perspective view of the second end of one of the fitting holding stations showing the details of construction.

Referring now to the drawings, and particularly to FIGURES 1 and 2, the numeral 10 generally designates the apparatus of the present invention and includes two end supports 12 and 14 which are preferably rotatably supported such as on a suitable stand or supporting structure which includes a base 16 and legs 18, whereby the apparatus 10 may be suitably transported to a job site, to a working shop, or other desired location for prefabricating the plumbing soil pipe joints. Secured between and supported by the end supports or plates 12 and 14 are a plurality of pipe and fitting holding stations here designated as stations A, B, C, and D, which may be suitably rotated to various positions to allow the pipe joints and pipe fittings to be moved into and out of various working, loading or unloading positions.

Referring now to FIGURES 1–4, station A may be a pipe section holding station which includes two ring supporting rods 20 and 22 which are rotatably supported between end supports 12 and 14 and are positioned parallel to each other. A plurality of different sized rings 24, 26 and 28 are secured to and supported by each of the rotatable elongate supporting rods 20 and 22. It is noted that rings of the same size on each of the supporting rods are connected in the same plane. That is, all of the rings 24 connected to supporting rod 20 are in the same plane and similarly rings 26 and 28 connected to the rod 20 are in the same plane. The same is true of the various sized rings 24, 26 and 28 in their connection to the rotatable ring supporting rod 22. In addition, the rings of the same size on the rod 20 are positioned parallel to a corresponding same sized ring on the supporting rod 22 and the axis of the rings on one support rod are in a vertical plane with the corresponding sized rings on the other support rod. Thus, as noted from the drawings, a pipe section may be conveniently supported by the rings of the same size connected to both of the ring supporting rods 20 and 22 and held in a vertical plane. In addition, the ring supports have the advantage of supporting the pipe joints by merely inserting them into two rings and the upper ring will support the section by contacting the pipe box shoulder.

In general, a pipe joint is made by providing a calking compound such as oakum in the joint, pouring hot melted lead into the joint and securely packing the joint. Thus, as best seen in FIGURES 1, 2 and 3, a plurality of pipe sections 30 may be held in the vertical position with the pipe box 32 directed upwardly to receive the desired fitting or next pipe joint (not shown). Thus, the pipe sections 30 are held at a convenient working position and a plurality of identical joints may be quickly and easily prepared after the pipe sections 30 have been slipped into position. After the joint is made, the units may be easily removed from the slip ring holders. The rings are particularly advantageous as not requiring any gripping devices which would require time consuming effort in replacing and removing the pipe sections 30.

It is also noted that the elongate rotatable supporting rods 20 and 22 may be rotated to bring into position a different set and sized rings 26 or 28, as desired. Thus, the apparatus may be quickly adjusted to accommodate a plurality of sizes of rings, here shown for convenience as three, to carry and support the various sized pipe sections 30. Preferably, the different sized rings 24, 26 and 28 are connected to the rods at 120° to each other and thereby provide a compact structure for carrying a plurality of pipe sections 30 and yet providing holding structures which do not interfere with each other.

While unnecessary to the invention, ring reinforcing rods 34 may be provided connected to the ring supporting rods 20 and 22 respectively and to the outer periphery of the various rings 24, 26 and 28 for adding sturdiness to the construction.

Stations B and D may be identical and are also rotatably supported between end plates 12 and 14. As best seen in the details of construction of FIGURES 5 and 6, an elongate rotatable fitting support rod 40 is provided which supports a plurality of fitting clamps 42. Each fitting clamp includes two fitting jaws 44 and 46 for gripping opposite sides of a pipe fitting and holding it securely in place. Preferably, one of the jaws 44 is arcuate in cross-section and of sufficient length to provide a stable holding medium for the pipe fitting. One of the gripping jaws, such as 44, is securely connected to the rotatable rod support 40 and the other jaw, such as 46, is movable towards the fixed jaw. A jaw locking rod 48 is provided for slidably supporting and carrying the movable jaw 46. A jaw adjusting member 50 which includes a set screw 52 is provided for slidable movement on the jaw locking rod 48 and against which a spring 54 is positioned to yieldably urge the movable jaw 46 towards the fixed jaw 44. Thus, by adjusting the position of the adjusting member 50 on the locking rod 48 various sized pipe fittings may be held in position in the clamps 42. Any suitable means such as a jaw guide 56 may be provided to suitably align the movable jaw with the fixed jaw 44.

By means of the adjusting member 50 and the spring 54 the position of the movable jaw 46 may be set with reference to the fixed jaw 44 so that pipe fittings may be loosely held between the jaws 44 and 46 by inserting the fittings after retracting the movable jaw 46. However, in order to securely lock the pipe fittings in place between the jaws 44 and 46 a locking mechanism is provided which draws the rod 48 in a direction to increase the force of all of the springs 54 acting against then coacting movable jaws 46. Such a means may be a handle 58, and a lever 60 and ratchet 62 locking means. Thus, after fittings are individually placed between the jaws of each clamp 42, the entire bank of fitting clamps 42 may be locked into tighter engagement for securely holding the pipe fittings therein.

Referring specifically to FIGURE 6, any suitable means for rotating the supporting rod 40 with reference to the end plates 12 and 14 may be used. For instance, a simple threadable pin 64 which is secured to the rod 40 may be suitably aligned and screwed into a plurality of openings 66 in the end plates 14. Preferably, the openings 66 should be placed radially about the axis of the rod 40 on 45° centers. Thus, it is noted that the fitting clamps 42 are adapted to hold various types and sizes of pipe fittings such as Y's, T's, elbows, 45° bends and other shapes. In addition, because of the fact that the support rod 40 is rotatable the fittings can be positioned in a vertical plane with the end to be joined placed in a horizontal position for suitably making a hot lead sealed joint.

However, there are several types of fittings such as an X or universal fitting which, because of the fact that it has extensions in three or more directions, is not adapted to be clamped in a clamp 42. Thus, as best seen in FIGURES 3 and 4, a station C is provided having a plurality of suitable jaws 70 and which is secured to a flat table surface 72 for gripping odd sized fittings as best seen in FIGURE 2. Any suitable or conventional gripping jaws are satisfactory.

In use, and in general, the stations A, B, C and D may be used independently of each other to make a plurality of identical piping units comprised of two or more sections of pipe or pipe fittings. For instance, assuming that a job includes the joining of a fitting to one of the sections 30, the sections 30 are positioned in the suitable sized rings 24 as shown in FIGURES 1, 2 and 3 wherein the rotatable ring supporting rods 20 and 22 have been suitably rotated to align the same size rings 24 in a vertical plane. The pipe sections 30 are easily and quickly slid into place and are retained therein by the abutting of the pipe box 32 on the top ring 24. The fitting to be joined to the top thereof is then put into place, suitably calked and hot lead poured therein and hammered into place to make a secure pipe joint. Because of the use of the plurality of the sections 30, the joints may be made quickly and one after the other. Simultaneously while working on the pipe sections 30 at station A, another worker may be working on the opposite side at section C making joints with odd shaped fittings such as X's and universal fittings.

And as best seen in FIGURE 4, the entire apparatus 10 may be rotated whereby stations B and D are positioned at the side positions for preparing joints.

As best seen in FIGURES 5 and 6, various types of pipe fittings such as Y's, bends and T's may be positioned in fitting clamps 42 by insertion between the jaws 44 and 46 and thereafter securely locked into place by means of the actuating handle 58 and the lever and ratchet means 60 and 62. In addition, the rotatable fitting support 40 may be, as best seen in FIGURE 6, rotated to any position relative to the end supports 12 and 14 so as to position the end of the fitting to be made into a joint in a horizontal direction to receive the hot lead joint. And as best seen in FIGURE 4 units are being assembled at stations B and D, the units previously assembled at section A may be removed and new pipe sections 30, which may be of a different size so as to utilize rings 28, may now be inserted. Thus, workers can be simultaneously working on as many as three stations at a time. While generally the stations are used independently of each other, adjacent stations may on occasion, depending upon the pipe arrangement to be fabricated, hold adjacent sections of pipe or fittings which are joined together.

Referring to FIGURES 1 and 2, exterior lugs 80 and 82 may be provided on the end plate 14 limiting the rotation of the apparatus 10 and for aligning the stations A, B, C and D at specific 90° positions. That is, referring to FIGURE 2, with lug 82 in position against one of the legs 18, the stations are in one position and by turning the ends 12 and 14 until lug 80 contacts the opposite leg 18, the stations are quickly and accurately indexed to a different position.

While the present apparatus depends upon good production scheduling, it does provide a prefabrication apparatus which can be utilized to accommodate various sized and the various shapes of pipe fittings that are utilized in a plumbing system and can support these members for making a plurality of identical piping units thereby reducing the number of joints required to be made at the job site. While the present apparatus is suitable for transportation to the job site, it can be used in the shop to prepare and prefabricate pipe joints in advance or allow the work to proceed even in inclimate weather conditions. It has been found that this apparatus will reduce the labor costs in making a lead joint from 45¢ to less than 10¢.

The present invention, therefore, is well adapted to carry out the objects and attain the ends and advantages mentioned as well as others inherent therein. While a presently preferred embodiment of the invention is given for the purpose of disclosure, numerous changes in details of construction and arrangement of parts may be made which will readily suggest themselves to those skilled in the art and which are encompassed within the spirit of the invention and the scope of the appended claims.

What is claimed is:

1. A plumbing pipe fabrication apparatus comprising, two end supports,
means for supporting said end supports for rotation,
two elongate pipe ring supports rotatably supported from and between said end supports, said elongate supports being spaced from and parallel to each other,
a plurality of pipe support rings of one size connected to each of said elongate supports,
a plurality of pipe support rings of a second size connected to each of said elongate supports,
the pipe support rings of each size on each of said elongate supports being connected in the same plane,
each of the pipe support rings of each size on one of said elongate supports being in a vertical plane with one of the pipe support rings of the same size on the other of said elongate supports whereby the rings of the same size on said elongate supports may support lengths of pipe in a vertical plane.

2. The invention of claim 1 including,
an elongate pipe fitting support rotatably supported from and between said end supports, said fitting support being spaced from and parallel to said two elongate pipe supports,
a plurality of first fitting jaws connected to said fitting support,
a plurality of second fitting jaws cooperating with said first fitting jaws and connected to said fitting support,
one of said first and second fitting jaws being yieldly urged toward the other of said first and second fitting jaws, and
locking means moving said first and second fitting jaws toward each other thereby securely holding pipe fittings therebetween.

3. The invention of claim 2 wherein said first fitting jaws are arcuate.

4. A plumbing pipe fabrication apparatus comprising, two end supports,
means for supporting said end supports for rotation,
a plurality of elongate fitting supports rotatably supported from and between said end supports, said fitting supports being spaced from and between said end supports, said elongate fitting supports being spaced from and parallel to each other,
a plurality of arcuate pipe fitting jaws connected to each of said fitting supports and positioned to move in a vertical plane as said fitting supports are rotated,
a plurality of movable jaws supported on each of said fitting supports and positioned to coact with said arcuate jaws to hold a pipe fixture,
means yieldably urging said movable jaws toward said arcuate jaws, and
locking means for locking said movable jaws relative to said arcuate jaws.

5. A plumbing pipe fabrication apparatus comprising, two end plates,
means for supporting said end plates for rotation,
three pipe working stations supported between said end plates and spaced from each other,
one of said stations including,
two elongate pipe ring supports rotatably supported from and between said end plates, said elongate pipe supports being spaced from and parallel to each other,
a plurality of pipe support rings of a first size connected to each of said elongate supports,
a plurality of pipe support rings of a second size connected to each of said elongate supports,
the pipe support rings of each size on each of said elongate supports being connected in the same plane,
each of the pipe support rings of each size on one of said elongate supports being in a vertical plane with one of the pipe support rings of the same size on said other elongate support whereby they may support lengths of pipe in a vertical plane,
and another of said stations including,
an elongate fitting support rotatably supported from and between said end plates,
a plurality of first fitting jaws connected to said fitting support,
a plurality of second fitting jaws cooperating with said first fitting clamps and connected to said fitting support,
one of said first and second jaws being yieldably urged toward the other of said first and second fitting jaws, and
locking means locking said first and second fitting jaws toward each other thereby securely holding pipe fittings therebetween.

6. The invention of claim 5 wherein one of said jaws is arcuate in cross-section.

7. The invention of claim 5 wherein said fitting jaws are positioned to hold a pipe joint in a horizontal plane.

8. The invention of claim 5 wherein said first and second jaws may be adjustably positioned relative to each other to hold different sized fittings.

9. The invention of claim 5 including,
a support for holding said apparatus,
positioning lugs on one of said end plates coacting with said support for indexing the movement of the stations from one position to another position.

References Cited in the file of this patent

UNITED STATES PATENTS

| | | |
|---|---|---|
| 2,662,433 | Braun | Dec. 15, 1953 |
| 2,700,949 | Kunzi | Feb. 1, 1955 |
| 2,724,175 | Kjellberg | Nov. 22, 1955 |
| 3,051,124 | Schlensker et al. | Aug. 28, 1962 |